Nov. 12, 1968

W. C. HEITHAUS 3,411,113

MICROWAVE GYROMAGNETIC DEVICE WHEREIN THE GYROMAGNETIC
MEMBER HAS SEVERAL PARALLEL APERTURES
THROUGHOUT ITS LENGTH

Filed Dec. 2, 1966

INVENTOR.
WILLIAM C. HEITHAUS
BY
S.C.Heaton
ATTORNEY

Nov. 12, 1968   W. C. HEITHAUS   3,411,113
MICROWAVE GYROMAGNETIC DEVICE WHEREIN THE GYROMAGNETIC
MEMBER HAS SEVERAL PARALLEL APERTURES
THROUGHOUT ITS LENGTH
Filed Dec. 2, 1966                                2 Sheets-Sheet 2

INVENTOR.
WILLIAM C. HEITHAUS
BY
S.C.Yeaton
ATTORNEY

United States Patent Office 3,411,113
Patented Nov. 12, 1968

3,411,113
MICROWAVE GYROMAGNETIC DEVICE WHEREIN THE GYROMAGNETIC MEMBER HAS SEVERAL PARALLEL APERTURES THROUGHOUT ITS LENGTH
William C. Heithaus, Clearwater, Fla., assignor to Sperry Rand Corporation, a corporation of Delaware
Filed Dec. 2, 1966, Ser. No. 598,864
13 Claims. (Cl. 333—24.1)

ABSTRACT OF THE DISCLOSURE

A microwave gyromagnetic device containing a plurality of parallel, longitudinally-extending apertures threaded by electrical conductors through which electrical currents may be transmitted to establish individual magnetic fields around prescribed apertures, the individual magnetic fields combining to produce a net magnetic bias field having a desired orientation in a plane transverse to the longitudinal axis of the gyromagnetic member for interacting with an electromagnetic wave propagating therein.

---

This invention relates to microwave gyromagnetic devices and more particularly to means for establishing a magnetic bias in gyromagnetic materials.

The operation of gyromagnetic materials such as ferrites is based upon an interaction between electron spins aligned by a magnetic bias field and the magnetic field of an electromagnetic wave. The interaction develops, however, only when the bias and R.F. magnetic fields are orthogonally oriented and under these conditions the magnetic bias field may affect the electromagnetic wave either reciprocally or non-reciprocally depending on the polarization of the electromagnetic wave. Non-reciprocity usually requires a circularly polarized wave although certain devices utilize the principle of Faraday rotation to obtain non-reciprocal operation with linearly polarized waves. Reciprocal operation, however, always requires a linearly polarized electromagnetic wave orthogonally oriented with respect to the magnetic bias field.

The operation of gyromagnetic devices also depends on the magnitude of the bias field. If the magnitude of the bias field is set at a value below the gyromagnetic resonance level, the interaction between the bias and R.F. magnetic fields produces a change in the phase velocity of the electromagnetic wave as it propagates through the gyromagnetic material. When the magnitude of the bias field is increased to the gyromagnetic resonance level, a reciprocal phase shifter functions as an attenuator or reciprocal loss device and a non-reciprocal phase shifter functions as an isolator or non-reciprocal attenuator.

Besides the polarization of the electromagnetic wave and the magnitude of the bias field, the intrinsic characteristics of the gyromagnetic material are also significant in determining the nature of operation of a gyromagnetic component. Ferrites having a square hysteresis loop magnetization characteristic readily retain their magnetization. Such ferrites, when constructed in the form of toroids having closed magnetic paths, are particularly useful, for example, as digital latching-type phase shifters in electronically scanned radars. Ferrites which do not have a square hysteresis loop characteristic are not capable of maintaining their magnetization. These ferrites are particularly useful, for example, in continuously variable phase shifters or single sideband modulators.

A well known prior art single sideband modulator comprises a rotating 180° differential phase shift section (half-waveplate) positioned between two 90° differential phase shift sections (quarter-waveplates). A linearly polarized electromagnetic wave incident upon either of the quarter-waveplates is converted to a circularly polarized wave which is frequency shifted by the half-waveplate and then reconverted to a linearly polarized form by the other quarter-waveplate; the magnitude and polarity of the frequency shift being determined respectively by the rate and sense of rotation of the half-waveplate about its longitudinal axis. If ferrite phase shift sections are used the frequency shift may be produced by positioning electromagnet field windings in space quadrature about the periphery of a stationary half-waveplate and driving the windings with electric signals having a relative phase displacement of 90°. Although this method eliminates mechanical rotation of the half-waveplate, it is still undesirable because it necessitates the use of large field windings which increases the size and weight of the device thereby severely limiting the maximum modulation frequency. The present invention overcomes these limitations by providing means internal to the gyromagnetic material for generating a rotating transverse bias field without the necessity for either mechanical rotation or external electromagnet field windings.

Reciprocal latching-type digital phase shifters utilize ferrite toroids and operate by switching between two different magnetization states to provide two discrete values of phase shift. These phase shifters are switched by means of current pulses flowing through an electrical conductor threading the toroidal aperture. The switching may be between either two magnetization states of unequal magnitude or polarity in a single flux path, known as magnitude or collinear switching or two remanent magnetization states in different but intersecting flux paths, known as orthogonal or non-collinear switching. The orthogonal switching technique is free of certain limitations inherent in the magnitude switching technique which unduly complicate the driver equipment and restrict the maximum switching rate. For these reasons orthogonal switching has been deemed preferable. Prior art reciprocal latching-type digital phase switches employing orthogonal switching techniques generally comprise toroidal ferrites with one or more apertures having an axis of symmetry transverse to the direction of the electromagnetic wave propagation and another aperture having a longitudinal axis of symmetry parallel to the direction of the electromagnetic wave propagation. These devices have been used only in transmission line systems wherein the center conductor of the transmission line threads the longitudinal aperture. Besides being restricted to transmission line systems, these prior art configurations provide closed magnetic paths about the longitudinal aperture only at the ends of the gyromagnetic material thereby seriously impairing the latching and fast switching capability of the devices.

The present invention provides a microwave gyromagnetic structure which overcomes the aforementioned limitations of the cited devices and is readily adaptable to be utilized in various microwave components such as reciprocal and non-reciprocal phase shifters, modulators, attenuators, isolators and cut-off switches.

It is a principal object of the present invention, therefore, to provide a microwave gyromagnetic device incorporating means for internally generating a magnetic bias field having any desired orientation in a plane transverse to the longitudinal axis of the device.

Another object of the invention is to provide a gyromagnetic device which is adaptable for use in various microwave components.

Another object of the invention is to provide a microwave gyromagnetic device capable of operating in combination with relatively simple and inexpensive electronic driver equipment.

Another object of the invention is to provide a microwave single sideband modulator having greater efficiency and reduced size and weight and capable of operating at higher modulation rates.

A further object of the invention is to provide an improved digital gyromagnetic phase shifter capable of operating at fast switching rates and consuming relatively little power.

A still further object is to provide an improved reciprocal latching-type digital gyromagnetic phase shifter capable of operating in both waveguide and transmission line systems.

These and other objects of the invention are accomplished by the provision of a gyromagnetic member having a plurality of longitudinally-extending parallel apertures through which electrical conductors are threaded. Circumferential magnetic fields established around each aperture by the electrical current flowing in the conductors combine to produce a resultant magnetic bias field in a plane transverse to the longitudinal dimension of the gyromagnetic member, the member being disposed in a microwave transmission medium wherein the bias field interacts with the magnetic field of an electromagnetic wave propagating in the medium.

For a more complete understanding of the present invention, reference should be made to the following detailed specification and accompanying drawings wherein.

Figure 1:
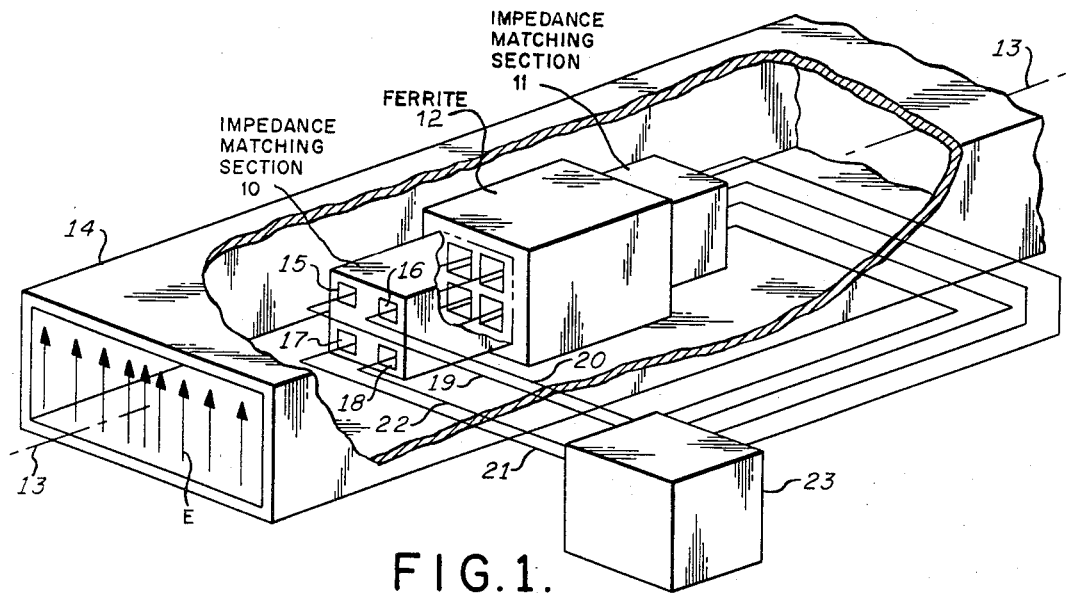
FIG. 1 is a perspective view of an embodiment of the invention operating as a digital latching-type ferrite phase shifter.

Referring to FIG. 1, a reciprocal latching-type digital phase shifter comprises impedance matching sections 10 and 11 abutting each end of ferrite member 12 symmetrically positioned along the longitudinal axis 13 of rectangular waveguide 14. Apertures 15, 16, 17 and 18 extend parallel to one another throughout the length of the ferrite member and are uniformly distributed about the longitudinal axis. For convenience in fabricating the device, the apertures are also extended through the length of the impedance matching sections but this is not essential for its operation. Electrical conductors 19, 20, 21 and 22 thread apertures 15 to 18 respectively and connect to signal source 23. These conductors should preferably be directed perpendicular to the electric field of the waveguide $TE_{10}$ mode represented by the vectors E aligned parallel to the narrow walls of the waveguide. Impedance matching sections 10 and 11 are preferably constructed of dielectric or ferrite material selected to provide an impedance match between the hollow and ferrite loaded portions of the waveguide. Since the electric currents flowing in the conductors drive the ferrite to various non-collinear remanent magnetization states, which present a range of permeabilities to the electromagnetic wave, the impedance match is preferably adjusted to a nominal permeability value. For some applications it may be adequate to provide impedance matching without incorporating separate elements simply by making the ferrite member exactly one-half guide wavelength long and in certain cases impedance matching may not even be required.

Figure 2A:
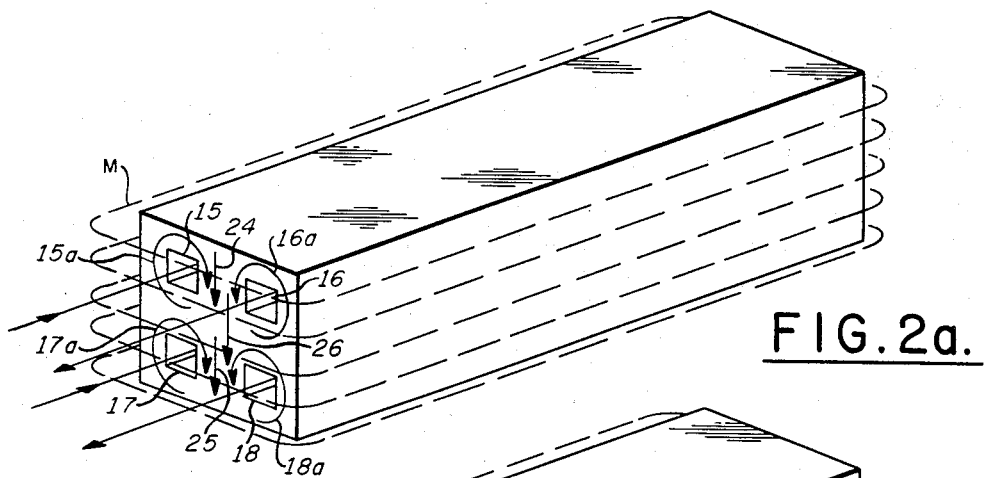
FIGS. 2a and 2b are illustrations of the gyromagnetic member utilized in FIG. 1 depicting the orientation of the bias and R.F. magnetic fields.

Refer now to FIG. 2a where the longitudinally extending arrows passing through the apertures represent electrical currents flowing through the conductors. When the switching circuits in the signal source direct current pulses from left to right through apertures 15 and 17 and from right to left through apertures 16 and 18 circumferential magnetic fields 15a, 16a, 17a and 18a are developed around the correspondingly numbered apertures. Circumferential fields 15a and 16a combine to produce magnetic field 24 while circumferential magnetic fields 17a and 18a form magnetic field 25. Magnetic fields 24 and 25, in turn, add to establish a net transverse bias field represented by vector 26 at the central region of the ferrite. The magnetic field M of the $TE_{10}$ mode is linearly polarized in the region of the bias field and aligned perpendicular thereto. Consequently, the conditions for reciprocal action exist. Since the magnitude of the bias field is less than the gyromagnetic resonance level, ferrite member 12 presents to the electromagnetic wave a permeability substantially different from unity and thereby alters its phase velocity.

To achieve digital operation the ferrite member must change the phase velocity of the electromagnetic wave by a different amount when the ferrite is driven to a non-collinear remanent magnetization state. This occurs when the signal source directs current from left to right through apertures 17 and 18 and from right to left through apertures 15 and 16 to produce the net transverse bias field represented by vector 27 in FIG. 2b. In this case the bias field is aligned parallel to the R.F. magnetic field M in the region of the ferrite so the ferrite presents to the electromagnetic wave a permeability approximately equal to unity, which corresponds to the unmagnetized state. By switching between orthogonal magnetization states in this manner, the performance is optimized because the magnetic bias paths are closed and the bias and R.F. magnetic fields are perpendicular for one of the magnetization states throughout the length of the ferrite member. Ferrite member 12 may alternatively be switched between non-collinear magnetization states which are oriented at various angles and not necessarily in space quadrature with some other magnetization state. For instance, currents may be directed into or out of apertures 15 and 18 to establish a magnetic field directed from aperture 17 to aperture 16 or conversely. Moreover, the apertures may be located at positions different from those indicated in FIGS. 1 and 2 but the illustrated locations are preferred so that ferrite member 12 may be constructed with four ferrite sections each having a single longitudinal aperture.

Figure 2B:
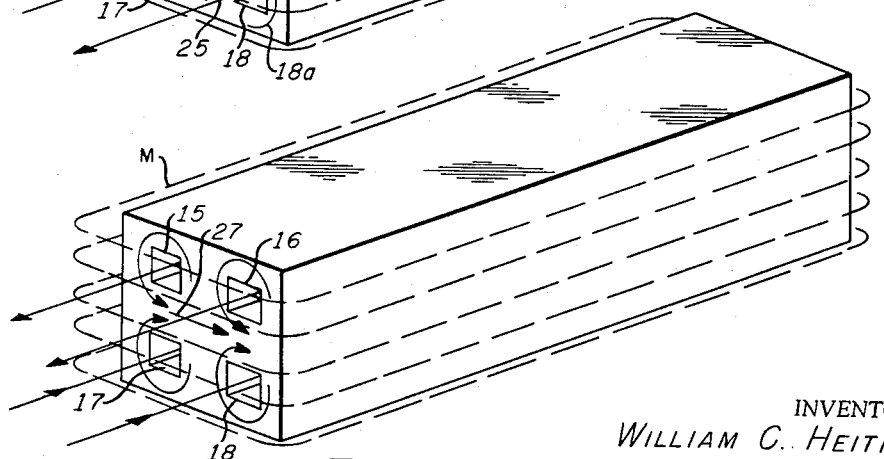

The structure o FIG. 1 may also be operated as a high-pass filter or cut-off switch. This is accomplished by either inserting metal blocks on both sides of ferrite member 12 or adjusting the waveguide dimensions so that its cut-off frequency is only slightly below the frequency of the electromagnetic wave propagating in the waveguide with a horizontal bias field as indicated in FIG. 2b. When the bias field is changed to the vertical orientation depicted in FIG. 2a, the waveguide cut-off frequency then shifts to a value higher than the frequency of the electromagnetic wave. In addition, it may function as a non-reciprocal apparatus. For instance, if the currents in apertures 15 through 18 are all directed either from left to right or opposite thereto, a circumferential magnetic bias field oriented transverse to the direction of wave propagation will be established near the periphery of the ferrite member. This biase field can interact with a circularly polarized microwave magnetic field in the peripheral region to provide non-reciprocal action.

Figure 3:
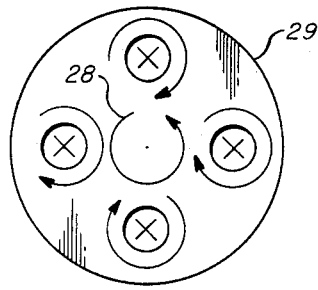
FIG. 3 is a cross sectional view of a phase shifter in a circular waveguide embodiment of the invention.

The ferrite member and impedance matching sections may also be incorporated in a circular wageguide propagating a linearly polarized $TE_{11}$ mode to provide reciprocal phase shifting action in a manner analogous to that described for the rectangular waveguide propagating the $TE_{10}$ mode in FIG. 1. Although not essential, it is preferable for the cross section of the ferrite member and the shape of the apertures to conform to the cross section of the waveguide. Non-reciprocal operation may be obtained in the circular waveguide by directing current into all of the apertures as indicated by the crosses in FIG. 3 to produce a circumferential magnetic field 28 at the central region of the ferrite member 29. Interaction between this bias field and a circularly polarized $TE_{11}$ mode propagating in a waveguide containing the ferrite produces the non-reciprocal phase shifting action.

In waveguide transmission devices the longitudinal axis of the ferrite member should be substantially collinear with the longitudinal axis of the waveguide to preclude non-reciprocal effects from developing in reciprocal devices. On the other hand, in a transmission line apparatus propagating a TEM mode, ferrite members may be positioned on diametrically opposite sides of the inner conductor of the transmission line in the region where the magnetic field of the TEM mode is linearly polarized to provide reciprocal operation. In actual practice, waveguide or transmission line phase shifting mechanisms employed in electronically scanned radars would comprise a plurality of phase shifting sections. In such devices individual control windings would thread the respective ferrite members which would be disposed in series with impedance matching sections and adjusted in length in proportion to the phase shift they were intended to produce.

The use of the invention in a single sideband modulator will now be described with reference to FIG. 4 wherein a cylindrical ferrite member 30 is symmetrically positioned along the longitudinal axis 31 of circular waveguide 32. The dielectric or ferrite sections 33 and 34 abutting each end of ferrite member 30 provide impedance matching between the hollow and ferrite loaded portions of the waveguide. Turnstile transitions 35 and 36 having matching posts 37 (only one shown) are connected to each end of the circular waveguide. Apertures 38, 39, 40 and 41 extend parallel to one another throughout the length of the ferrite member and are uniformly distributed about the longitudinal axis. For convenience in fabricating the device, the aperatures are also extended through the matching posts and impedance matching sections but this is not essential for its operation. Electrical conductors 42, 43, 44 and 45 thread apertures 38 through 41 respectively and connect to alternating current signal source 46. The ferrite member may be supported in the waveguide by stretching the wires taut or perhaps by filling all or part of the space between the ferrite and waveguide with a very low density dielectric foam.

A $TE_{10}$ mode propagating in rectangular waveguide 47 is converted by turnstile transducer 35 to a circularly polarized $TE_{11}$ more which propagates through circular waveguide 32 and is then reconverted by turnstile transducer 36 to a $TE_{10}$ mode for propagation in rectangular waveguide 48. The conversions between these dominant TE modes is accomplished by constructing and operating the turnstile transducers as explained in Radiation Laboratory Series, volume 9, first edition, copyright 1948 by the McGraw-Hill Book Company, Inc., pages 375 to 377. Other well known components such as a simple rectangular to circular waveguide tapered transition followed by a quarter-waveplate in circular waveguide may also be employed to perform the same function as a turnstile transducer. Ferrite member 30 is a half-waveplate in which a rotating magnetic bias field oriented transverse to the longitudinal axis 31 interacts with a circularly polarized $TE_{11}$ mode propagating in the circular waveguide as explained in Principles and Applications of Waveguide Transmission, copyright 1950 by D. Van Nostrand Company, Inc., pages 330 to 335. Referring to FIGS. 5a and 5b, in conjunction with FIG. 4 the rotating magnetic bias field is produced by applying to the pairs of conductors 42, 44 and 43, 45 alternating current signals having a relative phase displacement of 90°. When the signal applied to conductor pair 42, 44 is at a maximum with current flowing into aperture 38 and out of aperture 40, the resulting circumferential magnetic fields 38a and 40a combine to produce the transverse magnetic bias field 49. One-quarter cycle later when the signal applied to conductors 43 and 45 is at a maximum with current flowing into aperture 39 and out of aperture 41, the corresponding circumferential magnetic fields 39a and 41a combine to produce the transverse magnetic bias field 50. In this manner, as the phase of the individual signals applied to the aperture pairs varies, the bias field rotates continuously in a plane transverse to longitudinal axis 31. It should be noted that a continuously rotating bias field may also be provided by symmetrically disposing three apertures about the longitudinal axis of the gyromagnetic member and energizing the electrical conductors with a three phase system.

Figure 4:
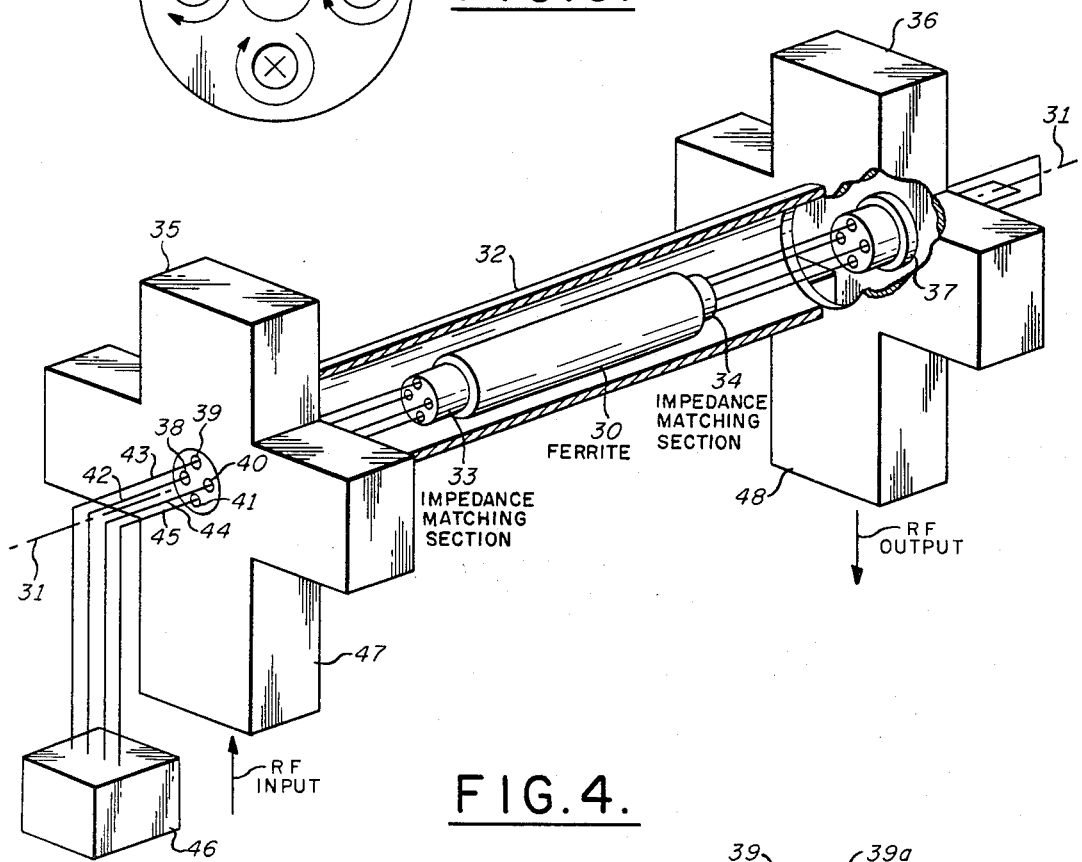
FIG. 4 is a perspective view of a single sideband modulator embodying the principles of the invention.
Figure 5A:
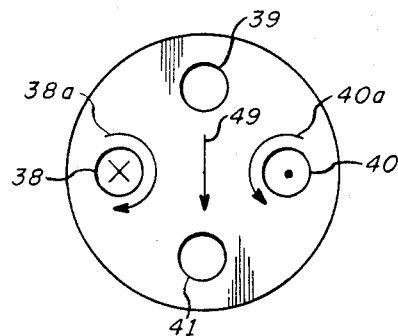
FIGS. 5a and 5b are illustrations of the gyromagnetic member utilized in FIG. 4 depicting the manner of generating a rotating bias field.
Figure 5B:
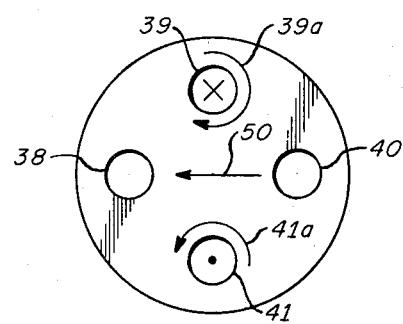

The structure of FIG. 4 may also be operated as a fixed phase shifter by adjusting the turnstile transitions 35 and 36 to provide respectively a transformation from a $TE_{10}$ mode to a linearly polarized $TE_{11}$ mode and conversely so that the bias field is oriented either parallel or perpendicular to the magnetic field of the $TE_{11}$ mode. Moreover, in operating as either a fixed or continuously variable phase shifter, the turnstile transistors may be replaced by ferrite quarter-waveplates or other conventional components capable of providing a relative phase shift of 90° betwen two orthogonal linearly polarized electromagnetic wave components.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A gyromagnetic device comprising
   an electromagnetic wave propagating member,
   a gyromagnetic member having several parallel apertures extending throughout its length disposed longitudinally within the wave propagating member,
   electrical conducting means threading each aperture, and
   a source of electrical energy connected to the electrical conducting means, said source including means for controlling the direction of current flow in the electrical conducting means associated with individual apertures to produce around each aperture a circumferential magnetic bias field which combines with the circumferential magnetic bias fields around the other apertures to produce in the central region of the gyromagnetic member a net magnetic bias field capable of being oriented in one of several orientations in a plane normal to the direction of electromagnetic wave propagation.

2. A gyromagnetic device comprising
   electromagnetic wave propagating means for transmitting an electromagnetic wave along a confined path,
   a gyromagnetic member disposed longitudinally in the wave propagating means,
   said gyromagnetic member having several parallel apertures extending throughout its longitudinal dimension,
   electrical conducting means threading each aperture, and
   means for connecting the electrical conducting means to a source of electrical energy, 3. A gyromagnetic device comprising
   an electromagnetic wave propagating member,
   an element of polarizable gyromagnetic material disposed in the wave propagating member parallel to the longitudinal axis thereof and having several longitudinally extending apertures,
   means internal to the gyromagnetic member for establishing a net magnetic bias field therein in a plane transverse to the longitudinal axis thereof, and
   means for energizing said internal means and orienting the net magnetic bias field in one of several orientations in the transverse plane.

4. The apparatus of claim 1 and further including
   first and second impedance matching members abutting respective ends of the gyromagnetic member in collinear alignment with the longitudinal axis thereof, the impedance matching members having a plurality of apertures collinear with the plurality of apertures in the gyromagnetic member at the interfaces between the gyromagnetic member and impedance matching members.

5. The apparatus of claim 1 wherein
the wave propagating member is a waveguide supporting an electromagnetic wave having a linearly polarized magnetic component in a given region, and
the control means includes first means for energizing the electrical conducting means threading a first pair of apertures to produce a magnetic field in said normal plane and second means for energizing the electrical conducting means threading a second pair of apertures to produce in said normal plane a magnetic field orthogonally oriented to the magnetic field associated with the first pair of apertures.

6. The apparatus of claim 5 and further including means for providing an impedance match between the gyromagnetic member loaded and unloaded portions of the waveguide.

7. The apparatus of claim 5 wherein
the electromagnetic wave propagates in a dominant TE mode, the longitudinal axis of the gyromagnetic member is parallel to and substantially coincident with the longitudinal axis of the waveguide, the several apertures comprise four in number, the first means produces a net magnetic bias field directed to the linearly polarized magnetic component of the electromagnetic wave and the second means reorients the net magnetic bias field perpendicular to the linearly polarized magnetic component of the electromagnetic wave, the first and second means being actuated alternately to switch the magnetic bias between the parallel and perpendicular orientations.

8. The apparatus of claim 7 wherein
the source of electrical energy provides a signal of sufficient magnitude to produce a gyromagnetic resonance condition in the gyromagnetic member.

9. The apparatus of claim 7 wherein
the waveguide cross-sectional dimensions are adjusted to have a cut-off frequency slightly below the frequency of the electromagnetitc wave when the net magnetic bias field is parallel to the linearly polarized magnetic component and a cut-off frequency greater than the frequency of the electromagnetic wave when the net magnetic bias field is perpendicular to the linearly polarized magnetic component.

10. The apparatus of claim 5 wherein
the signal source energizes the conducting means such that a net circumferential magnetic field is established in the gyromagnetic member.

11. The apparatus of claim 10 wherein
electrical energy from the source of electrical energy is of sufficient magnitude to produce a gyromagnetic resonance condition in the gyromagnetic member.

12. The apparatus of claim 5 wherein
the waveguide has a circular cross-section for propagating a circularly polarized $TE_{11}$ mode and the source of electrical energy provides to the first and second aperture pairs alternating electrical signals having a relative phase displacement of 90° so that the net magnetic bias field rotates continuously in said normal plane.

13. The apparatus of claim 12 and further including means positioned at each end of the gyromagnetic member in the path of the electromagnetic wave for converting a linearly polarized wave to a circularly polarized wave and conversely.

References Cited

UNITED STATES PATENTS

| | | | |
|---|---|---|---|
| 3,277,401 | 10/1966 | Stern | 333—24.1 |
| 3,316,506 | 4/1967 | Whicker et al. | 333—24.1 |

HERMAN KARL SAALBACH, *Primary Examiner.*

PAUL L. GENSLER, *Assistant Examiner.*